June 12, 1928. 1,672,908
T. H. RUSHTON
VEHICLE WHEEL
Filed Nov. 17, 1926
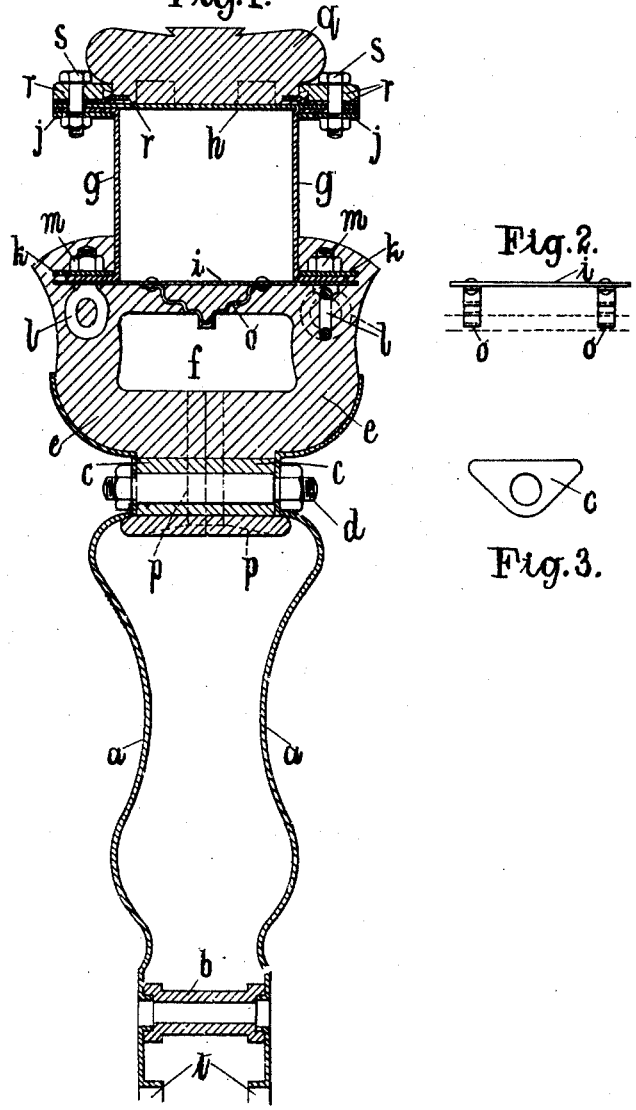

Patented June 12, 1928.

1,672,908

UNITED STATES PATENT OFFICE.

THOMAS HENRY RUSHTON, OF WORKSOP, ENGLAND.

VEHICLE WHEEL.

Application filed November 17, 1926, Serial No. 148,979, and in Great Britain December 5, 1925.

This invention relates to wheels for vehicles of the type described in my United States patent specification No. 1,466,550 dated August 28, 1923. This prior specification describes a disc wheel resiliently suspended from a tubular steel ring or hoop embedded in the tyre.

The wheel according to the present invention consists of a rigid central portion resiliently suspended by an india rubber annulus from an exposed rigid tubular steel hoop around which a tyre is adapted to be mounted. The exposure of the tubular steel hoop readily permits a detachable and renewal band tyre being employed.

The india rubber annulus, like the tyre which enclosed the tubular steel hoop described in the prior specification, has a cavity which permits mutual approach of the inwardly directed side of the tubular steel hoop and the rigid central portion of the wheel, unhindered except for the resulting compression of the side walls of the rubber annulus.

Preferably, but not necessarily, the rigid central portion of the wheel is built up of a pair of metal discs, separated by distance sleeves and at the periphery embracing the inner border of the rubber annulus and suspended therefrom by distance pieces of triangular or other section separating the discs and passing through the rubber.

The tubular steel hoop is preferably of box section being built up of sheet steel annular side plates of channel section, welded brazed or otherwise secured to inner and outer cylindrical peripheral hoops of sheet steel.

The connection of the outer periphery of the rubber annulus to the inner peripheral portion of the tubular steel hoop is effected by a combination of surface adhesion, interlocking, and moulding around the flanges of the lateral channel members of the hoop, which latter is enclosed together with the rubber in a mould in which the rubber is vulcanized.

The tyre is preferably a band tyre moulded on to two laterally separated built-up metal bands which are mounted and secured around the outer periphery of the tubular steel hoop.

In the accompanying drawings Fig. 1, is an axial section transverse to the plane of the wheel of a portion of the wheel extending from the hub to the periphery.

Figs. 2 and 3 show details.

The central portion of the wheel is built up of two stamped sheet metal discs $a$ separated adjacent to the hub by tubular distance pieces $b$ and near the periphery by distance blocks $c$, arranged at intervals.

The two discs $a$ are held together by bolts $d$ passing through the distance blocks $c$. The metal of the discs $a$ is stamped and plunged to form flanges around apertures fitting in shouldered recesses in the ends of the tubular distance pieces $b$ and thus hold these latter in place in absence of bolts passing therethrough.

The outer peripheral portions of the two discs $a$ diverge and embrace an india rubber annulus $e$ which by a reduced flange portion is clamped between the outer portions of the discs $a$. The distance blocks $c$, which are of triangular or other section, as shown in Fig. 3, pass through apertures in the clamped reduced portion of the rubber annulus $e$.

The rubber annulus $e$ is moulded with an annular cavity $f$, which is moulded on to and around the flanges laterally on the inner periphery of a tubular steel hoop. This steel hoop consists of a pair of annular stamped sheet steel side plates $g$ of channel section, interconnected at their outer and inner peripheries by sheet steel hoops $h$, $i$ to form a hoop of box section, with outwardly laterally directed flanges. Sheet steel hoops $j$ $k$ are also provided on the inside of the flanges of the plates $g$. The plates $g$ and sheet steel hoops $h$, $i$, $j$, $k$ are secured together by welding, brazing or the like.

As stated above the rubber annulus $e$ is moulded on to the inner periphery of the tubular steel hoop $g$, $h$, $i$, $j$, $k$ and around the inner peripheral flanges thereof. To promote the attachment of the rubber to the metal, metal eyes $l$ are provided at intervals around the inwardly directed surface of the inner flanges of the tubular steel hoop $g$, $h$, $i$, $j$, $k$, into which eyes $l$ the rubber interlocks. The rubber also is moulded over the nuts $m$ which retain the stems of the eyes $l$ in the respective flanges, and into the annular interstices between the components of the flanges.

Mainly to serve as distance pieces for positioning and holding a segmental core bar used for moulding the cavity $f$ in the rubber annulus $e$, but also serving to provide additional means to interlock the tubular steel hoop with the rubber crimped arched metal strips o are riveted at intervals (Fig. 2) around the inner periphery of the tubular steel hoop.

p indicate radial channels moulded in the rubber e for ventilating the cavity f. q is a solid rubber tyre moulded on to two laterally separated built-up metal bands r which are applied around the outer periphery of the tubular steel hoop and secured thereto by bolts s passing through the outer flanges thereof and the borders of the tyre bands r.

The entire wheel constitutes a detachable wheel capable of being mounted by a central aperture t on a hub of a vehicle suitable for reception, and on which it is secured by bolts passing through the tubular distance pieces b.

Although in the illustrated example the tubular steel hoop is of box section and the distance blocks c are of triangular section, these may be of other suitable shapes.

I claim:

1. A vehicle wheel comprising two metal discs, a rubber annulus mounted on to the periphery of said discs, a flanged steel hoop partially embedded in said rubber annulus, from which hoop said discs are resiliently suspended, a plurality of crimped arched metal strips riveted to said hoop on the inner peripheral portion embedded in said rubber annulus, additional interlocking means provided between said hoop and rubber annulus also embedded in same, a band tyre, two laterally separated built up metal bands moulded thereto being mounted on to the periphery of said steel hoop and means provided for securing said metal bands to said hoop.

2. A vehicle wheel comprising two metal discs being spaced apart around the hub and near the periphery by distance pieces, the outer peripheral portions of which discs diverge, a rubber annulus embraced by said discs, an annular cavity provided in said rubber annulus, a metal hoop partially embedded in said rubber annulus, flanges integral with said hoop, a plurality of crimped arched metal strips secured to said metal hoop and embedded in said annulus, additional interlocking means provided between said hoop and rubber annulus two laterally separated built-up metal bands, a band tyre moulded thereto, said metal bands mounted on to the periphery of said metal hoop and secured thereto by bolts.

3. A vehicle wheel comprising two metal discs, the outer peripheral portions of which diverge, distance pieces disposed between said discs around the hub and near the periphery respectively, a rubber annulus mounted on to the periphery of said discs and secured thereto, an annular cavity provided in said rubber annulus, a metal hoop partially embedded in said annulus, a plurality of crimped arched metal strips secured to the inner peripheral portion of said hoop, flanges integral with said metal hoop arranged on the inner and outer peripheral portions, a plurality of metal eyes attached to said inner flanges, the latter, the metal eyes and crimped arched metal strips embedded in said rubber annulus, two laterally separated built-up metal bands, a band tyre moulded thereto, said tyre mounted on to the periphery of said hoop, said metal bands being secured to the outer peripheral flanges of said metal hoop by bolts.

4. A vehicle wheel comprising two discs spaced apart by distance pieces, the outer peripheral portions of which discs diverge, a rubber annulus mounted on to and secured by bolts to said discs, an annular cavity in said annulus, radial channels provided in said rubber annulus, a metal hoop partially embedded in said annulus, a plurality of crimped arched metal strips secured to the inner peripheral portion of said hoop, flanges integral with said metal hoop arranged on the inner and outer peripheral portions, a plurality of metal eyes attached to said inner flanges the latter, the metal eyes and crimped arched metal strips embedded in said rubber annulus, two laterally separated built-up metal bands, a band tyre moulded thereto, said tyre mounted on to the periphery of said metal hoop, said metal bands being secured to the outer peripheral flanges of said hoop by bolts.

5. A vehicle wheel comprising two metal discs whose outer peripheral portions diverge, distance pieces interposed between said discs around the hub and near the periphery respectively, a rubber annulus embraced by diverged portions of said discs and secured thereto by bolts, a cavity in said annulus, radial ventilating channels in communication with said cavity, a steel hoop built up in sections, flanges formed on the inner and outer peripheral portions of said metal hoop, a plurality of metal eyes secured to said inner flanges, crimped arched metal strips riveted to said inner peripheral portion of said hoop, said inner flanges, metal eyes and crimped arched metal strips and part of said hoop embedded in said rubber annulus, two laterally separated built-up metal bands, a band tyre, the latter built up on said metal bands and mounted on to the periphery of said metal hoop, a plurality of bolts passing through said bands and outer flanges respectively securing the tyre thereto.

In testimony whereof I affix my signature.

THOMAS HENRY RUSHTON.